(12) United States Patent
Zagrebin et al.

(10) Patent No.: US 10,395,426 B2
(45) Date of Patent: Aug. 27, 2019

(54) AUGMENTED REALITY SYSTEM AND METHOD

(71) Applicant: EMC IP HOLDING COMPANY LLC, Hopkinton, MA (US)

(72) Inventors: Yuri Zagrebin, St. Petersburg (RU); Alexey Fomin, St. Petersburg (RU); Artem Bartashev, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 288 days.

(21) Appl. No.: 15/302,425

(22) PCT Filed: Dec. 23, 2015

(86) PCT No.: PCT/RU2015/000920
§ 371 (c)(1),
(2) Date: Oct. 6, 2016

(87) PCT Pub. No.: WO2017/111647
PCT Pub. Date: Jun. 29, 2017

(65) Prior Publication Data
US 2018/0018822 A1    Jan. 18, 2018

(51) Int. Cl.
| | |
|---|---|
| *G06F 15/16* | (2006.01) |
| *G06T 19/00* | (2011.01) |
| *G06F 3/06* | (2006.01) |
| *G06Q 10/06* | (2012.01) |
| *G06F 11/07* | (2006.01) |

(Continued)

(52) U.S. Cl.
CPC .......... *G06T 19/006* (2013.01); *G06F 3/0605* (2013.01); *G06F 3/147* (2013.01); *G06F 11/0784* (2013.01); *G06Q 10/06* (2013.01); *H04N 1/00037* (2013.01); *G05B 2219/2642* (2013.01); *G09G 5/397* (2013.01); *G09G 2340/12* (2013.01); *H05B 37/02* (2013.01)

(58) Field of Classification Search
CPC ..... G06T 19/006; G06F 3/0605; G06F 3/147; G06F 11/0784
See application file for complete search history.

(56) References Cited

U.S. PATENT DOCUMENTS 6,308,205 B1 * 10/2001 Carcerano ........... H04L 41/0253
 709/220
8,046,702 B2 * 10/2011 Endoh ................ G03G 15/5016
 715/204

(Continued)

OTHER PUBLICATIONS

International Search Report and Written Opinion from related International Application Serial No. PCT/RU2015/000920, dated Sep. 13, 2016 (10 pages).

*Primary Examiner* — Moustafa M Meky
(74) *Attorney, Agent, or Firm* — Brian J. Colandreo; Mark H. Whittenberger; Holland & Knight LLP (57) ABSTRACT

A computer-implemented method, computer program product, and computing system for receiving a unique identifier on a client electronic device. The unique identifier is associated with at least one IT component. Status information is obtained concerning the at least one IT component. A visual representation of the at least one IT component is generated on a display screen of the client electronic device. A graphical representation of the status information is superimposed onto the visual representation of the at least one IT component.

15 Claims, 7 Drawing Sheets

(51) Int. Cl.
  *H04N 1/00* (2006.01)
  *G06F 3/147* (2006.01)
  G09G 5/397 (2006.01)
  H05B 37/02 (2006.01)

(56) References Cited

U.S. PATENT DOCUMENTS

| | | | | |
|---|---|---|---|---|
| 8,286,106 B2* | 10/2012 | Bergman | ............ | G06F 3/0488 |
| | | | | 715/802 |
| 8,451,275 B2* | 5/2013 | Lee | ............ | G06T 13/00 |
| | | | | 345/473 |
| 8,849,980 B2* | 9/2014 | Dieberger | ............ | G06F 11/328 |
| | | | | 709/223 |
| 9,959,190 B2* | 5/2018 | Klein | ............ | G06F 11/327 |
| 2007/0185987 A1* | 8/2007 | Dieberger | ............ | G06F 11/328 |
| | | | | 709/224 |
| 2008/0307329 A1* | 12/2008 | Endoh | ............ | G03G 15/5016 |
| | | | | 715/762 |
| 2011/0115816 A1 | 5/2011 | Brackney | | |
| 2013/0031202 A1 | 1/2013 | Mick et al. | | |
| 2013/0114100 A1 | 5/2013 | Torii et al. | | |
| 2018/0107575 A1* | 4/2018 | Klein | ............ | G06F 11/327 |
| 2018/0113778 A1* | 4/2018 | Klein | ............ | G06F 11/327 |

* cited by examiner

AUGMENTED REALITY SYSTEM AND METHOD

TECHNICAL FIELD

This disclosure relates to augmented reality systems and, more particularly, to augmented reality systems configured for use in an IT infrastructure.

BACKGROUND

Storing and safeguarding electronic content is of paramount importance in modern business. Accordingly, large storage systems may be utilized to protect such electronic content. As would be expected, such large storage systems may be complex in nature and may include a plurality of discrete components, wherein each of these discrete components may be a serviceable item that has a finite life expectancy. Accordingly and in the event of a technical problem with a discrete components, it may be difficult to locate the discrete component that has failed or is failing.

SUMMARY OF DISCLOSURE

In one implementation, a computer-implemented method, executed on a computing device, includes receiving a unique identifier on a client electronic device. The unique identifier is associated with at least one IT component. Status information is obtained concerning the at least one IT component. A visual representation of the at least one IT component is generated on a display screen of the client electronic device. A graphical representation of the status information is superimposed onto the visual representation of the at least one IT component.

One or more of the following features may be included. The at least one IT component may include one or more of: a server system; a disk array system; a storage processor system; a storage processor/disk system; and a battery backup system. Generating a visual representation of the at least one IT component may include capturing an image of the at least one IT component using a camera included within the client electronic device, thus generating a captured image. Generating a visual representation of the IT component may include rendering the captured image on the display screen of the client electronic device to generate the visual representation of the at least one IT component. The unique identifier may be encoded within one or more of: an optical symbol affixed to the at least one IT component; and a wireless identifier tag affixed to the at least one IT component. The optical symbol affixed to the at least one IT component may be scanned to generate the unique identifier. The wireless identifier tag affixed to the at least one IT component may be scanned to generate the unique identifier.

In another implementation, a computer program product resides on a computer readable medium that has a plurality of instructions stored on it. When executed by a processor, the instructions cause the processor to perform operations including receiving a unique identifier on a client electronic device. The unique identifier is associated with at least one IT component. Status information is obtained concerning the at least one IT component. A visual representation of the at least one IT component is generated on a display screen of the client electronic device. A graphical representation of the status information is superimposed onto the visual representation of the at least one IT component.

One or more of the following features may be included. The at least one IT component may include one or more of: a server system; a disk array system; a storage processor system; a storage processor/disk system; and a battery backup system. Generating a visual representation of the at least one IT component may include capturing an image of the at least one IT component using a camera included within the client electronic device, thus generating a captured image. Generating a visual representation of the IT component may include rendering the captured image on the display screen of the client electronic device to generate the visual representation of the at least one IT component. The unique identifier may be encoded within one or more of: an optical symbol affixed to the at least one IT component; and a wireless identifier tag affixed to the at least one IT component. The optical symbol affixed to the at least one IT component may be scanned to generate the unique identifier. The wireless identifier tag affixed to the at least one IT component may be scanned to generate the unique identifier.

In another implementation, a computing system includes at least one processor and at least one memory architecture coupled with the at least one processor, wherein the computing system is configured to perform operations including receiving a unique identifier on a client electronic device. The unique identifier is associated with at least one IT component. Status information is obtained concerning the at least one IT component. A visual representation of the at least one IT component is generated on a display screen of the client electronic device. A graphical representation of the status information is superimposed onto the visual representation of the at least one IT component.

One or more of the following features may be included. The at least one IT component may include one or more of: a server system; a disk array system; a storage processor system; a storage processor/disk system; and a battery backup system. Generating a visual representation of the at least one IT component may include capturing an image of the at least one IT component using a camera included within the client electronic device, thus generating a captured image. Generating a visual representation of the IT component may include rendering the captured image on the display screen of the client electronic device to generate the visual representation of the at least one IT component. The unique identifier may be encoded within one or more of: an optical symbol affixed to the at least one IT component; and a wireless identifier tag affixed to the at least one IT component. The optical symbol affixed to the at least one IT component may be scanned to generate the unique identifier. The wireless identifier tag affixed to the at least one IT component may be scanned to generate the unique identifier.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
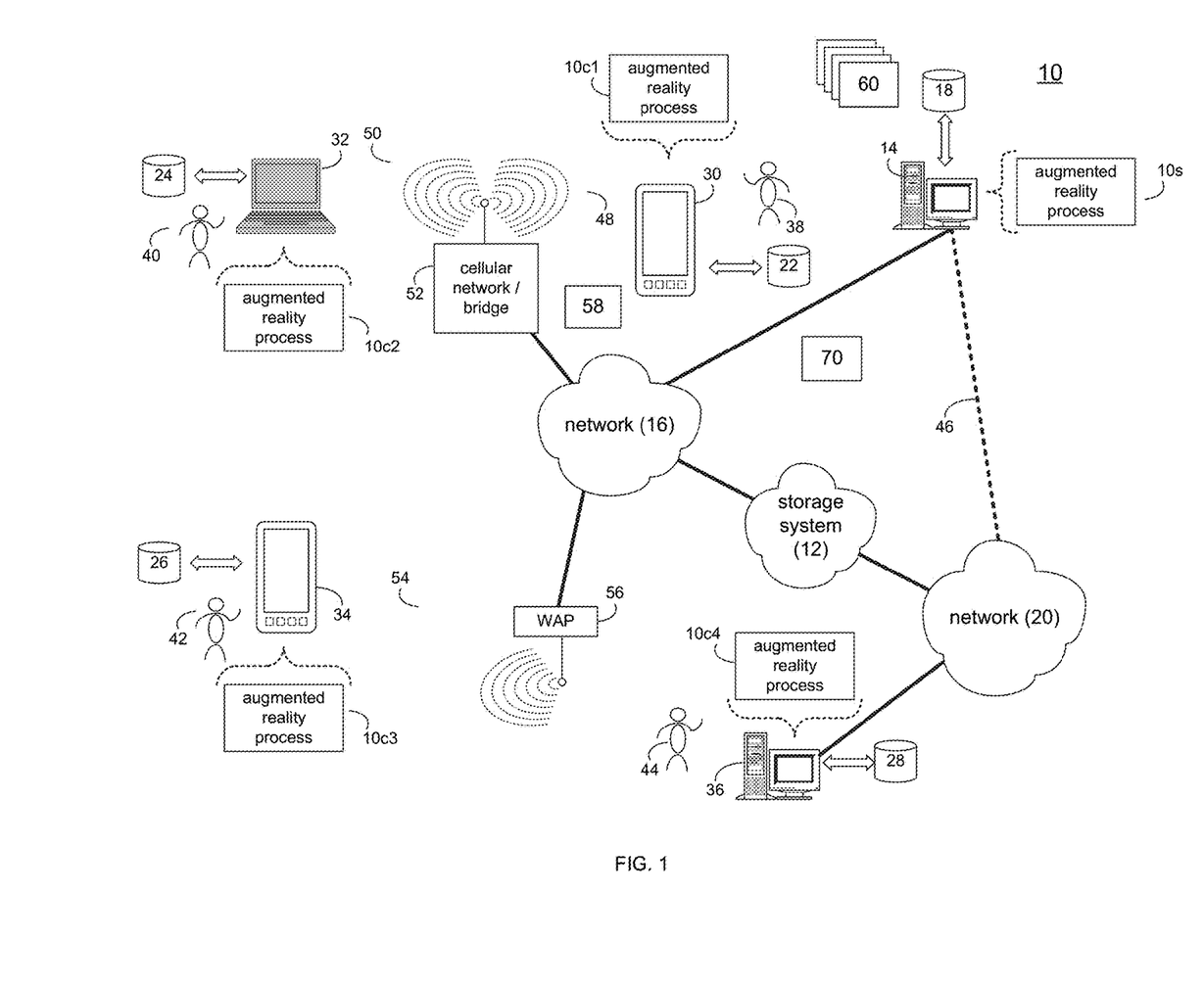
FIG. 1 is a diagrammatic view of a storage system and an augmented reality process coupled to a distributed computing network.

System Overview:

Referring to FIG. 1, there is shown augmented reality process 10. As will be discussed below in greater detail, augmented reality process 10 may be utilized to visually monitor the status of various components/devices included within a storage system (e.g., storage system 12).

Augmented reality process 10 may be implemented as a server-side process, a client-side process, or a hybrid server-side/client-side process. For example, augmented reality process 10 may be implemented as a purely server-side process via server-side augmented reality process 10s. Alternatively, augmented reality process 10 may be implemented as a purely client-side process via one or more of client-side augmented reality process 10c1, client-side augmented reality process 10c2, client-side augmented reality process 10c3, and client-side augmented reality process 10c4. Alternatively still, augmented reality process 10 may be implemented as a hybrid server-side/client-side process via server-side augmented reality process 10s in combination with one or more of client-side augmented reality process 10c1, client-side augmented reality process 10c2, client-side augmented reality process 10c3, and client-side augmented reality process 10c4. Accordingly, augmented reality process 10 as used in this disclosure may include any combination of server-side augmented reality process 10s, client-side augmented reality process 10c1, client-side augmented reality process 10c2, client-side augmented reality process 10c3, and client-side augmented reality process 10c4.

Server-side augmented reality process 10s may be a server application and may reside on and may be executed by computing device 14, which may be connected to network 16 (e.g., the Internet or a local area network). Examples of computing device 14 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a dedicated network device.

The instruction sets and subroutines of server-side augmented reality process 10s, which may be stored on storage device 18 coupled to computing device 14, may be executed by one or more processors (not shown) and one or more memory architectures (not shown) included within computing device 14. Examples of storage device 18 may include but are not limited to: a hard disk drive; a tape drive; an optical drive; a RAID device; a random access memory (RAM); a read-only memory (ROM); and all forms of flash memory storage devices.

Network 16 may be connected to one or more secondary networks (e.g., network 20), examples of which may include but are not limited to: a local area network; a wide area network; or an intranet, for example.

Examples of client-side augmented reality processes 10c1, 10c2, 10c3, 10c4 may include but are not limited to a web browser, a specialized desktop application, a game console user interface, or a specialized handheld application (e.g., an application running on e.g., the Android™ platform or the iPhone™ platform). The instruction sets and subroutines of client-side augmented reality processes 10c1, 10c2, 10c3, 10c4, which may be stored on storage devices 22, 24, 26, 28 (respectively) coupled to client electronic devices 30, 32, 34, 36 (respectively), may be executed by one or more processors (not shown) and one or more memory architectures (not shown) incorporated into client electronic devices 30, 32, 34, 36 (respectively). Examples of storage devices 22, 24, 26, 28 may include but are not limited to: hard disk drives; tape drives; optical drives; RAID devices; random access memories (RAM); read-only memories (ROM), and all forms of flash memory storage devices.

Examples of client electronic devices 30, 32, 34, 36 may include, but are not limited to, data-enabled, cellular telephone 30, laptop computer 32, personal digital assistant 34, personal computer 36, a notebook computer (not shown), a server computer (not shown), a gaming console (not shown), a smart television (not shown), and a dedicated network device (not shown). Client electronic devices 30, 32, 34, 36 may each execute an operating system, examples of which may include but are not limited to Microsoft Windows™, Android™, WebOS™, iOS™, Redhat Linux™, or a custom operating system.

Users 38, 40, 42, 44 may access augmented reality process 10 directly through network 16 or through secondary network 20. Further, augmented reality process 10 may be connected to network 16 through secondary network 20, as illustrated with link line 46.

The various client electronic devices (e.g., client electronic devices 30, 32, 34, 36) may be directly or indirectly coupled to network 16 (or network 20). For example, data-enabled, cellular telephone 30 and laptop computer 32 are shown wirelessly coupled to network 16 via wireless communication channels 48, 50 (respectively) established between data-enabled, cellular telephone 30, laptop computer 32 (respectively) and cellular network/bridge 52, which is shown directly coupled to network 16. Further, personal digital assistant 34 is shown wirelessly coupled to network 16 via wireless communication channel 54 established between personal digital assistant 34 and wireless access point (i.e., WAP) 56, which is shown directly coupled to network 16. Additionally, personal computer 36 is shown directly coupled to network 20 via a hardwired network connection.

WAP 56 may be, for example, an IEEE 802.11a, 802.11b, 802.11g, 802.11n, Wi-Fi, and/or Bluetooth device that is capable of establishing wireless communication channel 54 between personal digital assistant 34 and WAP 56. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As discussed above, augmented reality process 10 may be utilized to visually monitor the status of various components/devices included within a storage system (e.g., storage system 12). Storage system 12 may be utilized by organizations to process and store data. Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™ Unix, or a custom operating system, for example.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
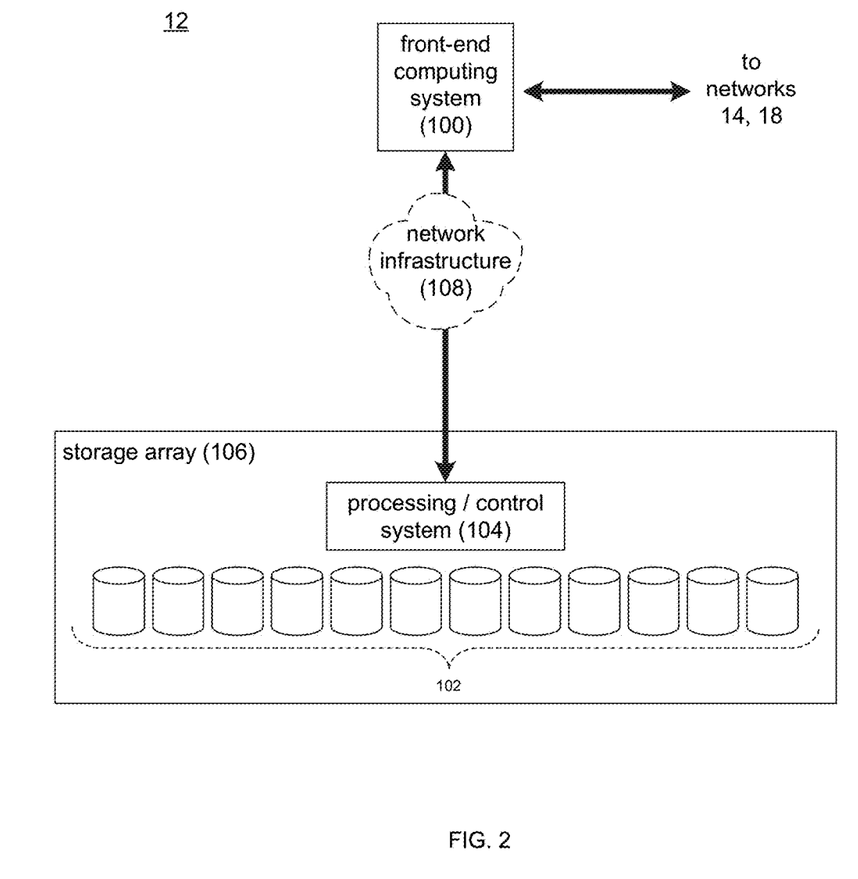
FIG. 2 is a diagrammatic view of the storage system of FIG. 1.

Referring also to FIG. 2, storage system 12 may include one or more computing systems (e.g., front-end computing system 100) and a plurality of storage targets 102. Examples of front-end computing system 100 may include, but are not limited to, one or more storage processors and/or one or more server computers. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/flash devices, wherein the combination of plurality of storage targets 102 and processing/control systems (e.g., processing/control system 104) may form storage array 106.

The manner in which storage system 12 is implemented may vary depending upon e.g. the level of redundancy/performance/capacity required. For example, storage system 12 may be a RAID device in which front-end computing system 100 is a RAID controller card and plurality of storage targets 102 are individual "hot-swappable" hard disk drives. An example of such a RAID device may include but is not limited to an NAS device. Alternatively, storage system 12 may be configured as a SAN, in which front-end computing system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. front-end computing system 100, plurality of storage targets 102, and processing/control system 106) may be coupled using network infrastructure 108, examples of which may include but are not limited to an Ethernet (e.g., Layer 2 or Layer 3) network, a fiber channel network, an InfiniBand network, or any other network infrastructure.

Figure 3:
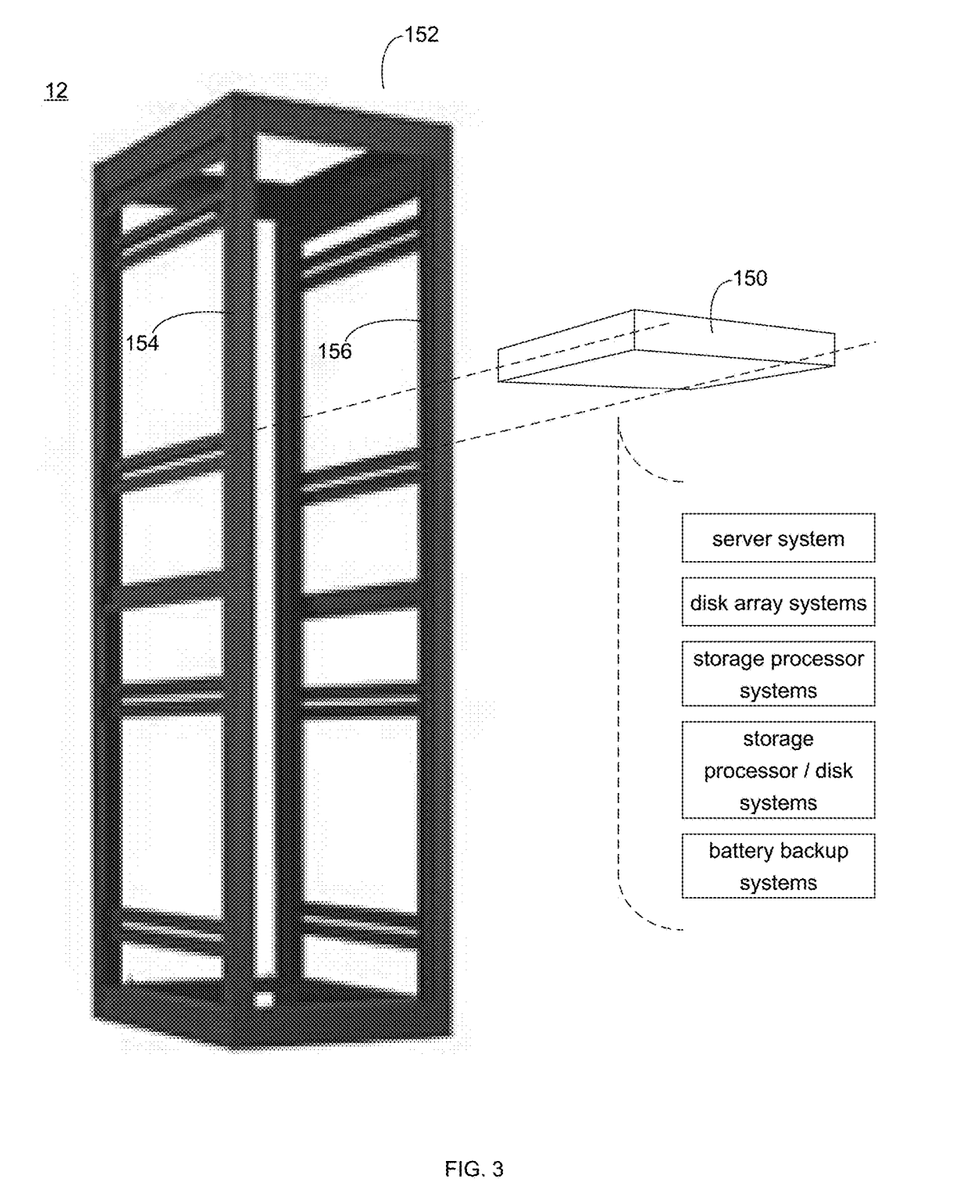
FIG. 3 is an isometric view of a storage system and a rack assembly.

Referring also to FIG. 3, storage system 12 may include one or more IT components (e.g., IT component 150), examples of which may include but are not limited to: server systems, disk array systems, storage processor systems, storage processor/disk systems, and battery backup systems.

An IT rack (e.g., IT rack 152) may be utilized to store and organize the IT components of storage system 12. For example, IT rack 152 may be placed within a computer room and various IT components may be attached to rails (e.g., NEMA rails 154, 156) included within IT rack 152, wherein these rails (e.g., NEMA rails 154, 156) may have a standard and defined spacing between them (e.g., 19"). Typically, IT devices that are configured to fit within IT rack 152 may be described as rack-mountable IT devices. Alternatively. IT device 150 may be a free-standing device that does not require an IT rack for mounting.

Figure 4:
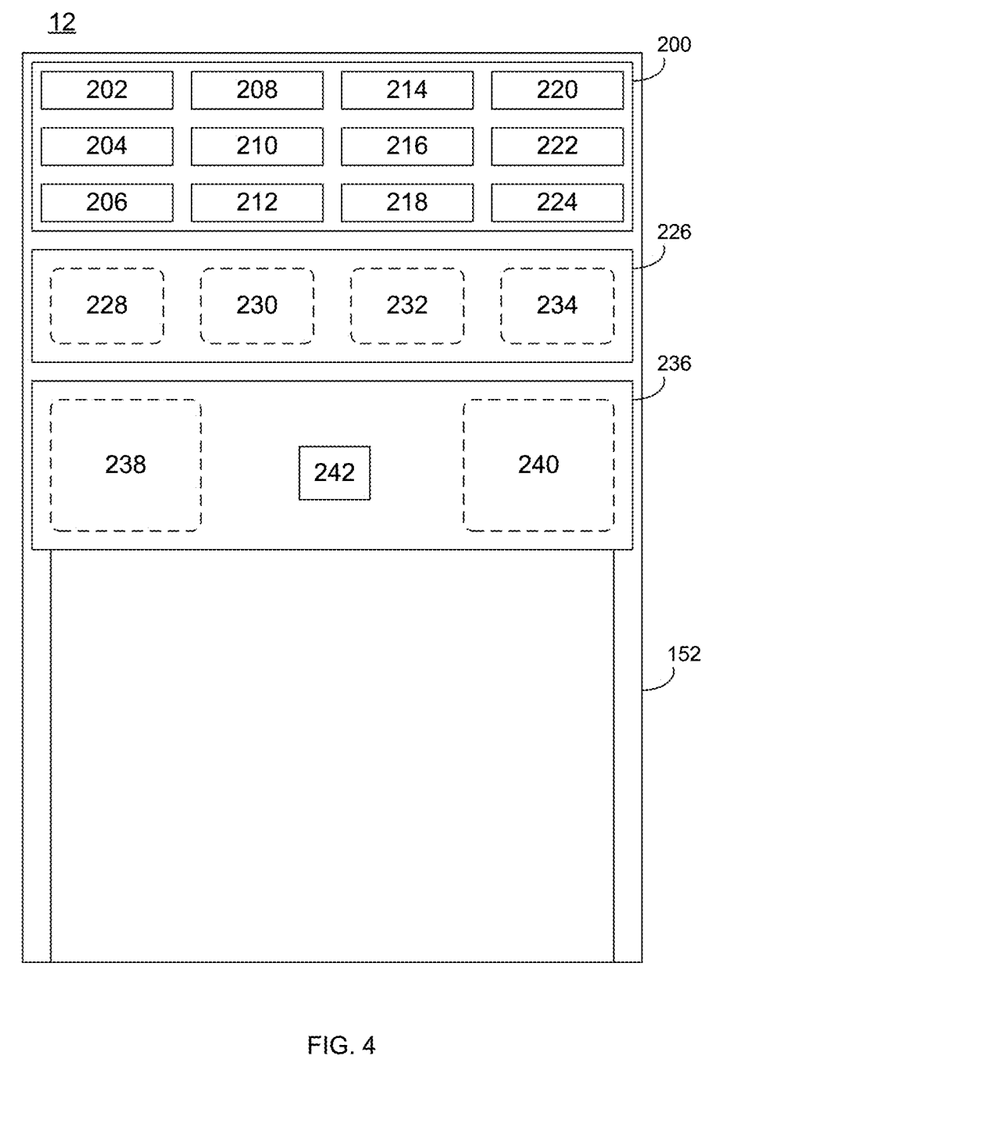
FIG. 4 is another diagrammatic view of the storage system of FIG. 1 mounted within the rack assembly of FIG. 3.

Referring also to FIG. 4, there is shown a front view of one implementation of storage system 12 that is mounted within IT rack 152. In this implementation, storage system 12 is shown to include disk array system 200, which includes twelve storage targets, namely storage targets 202, 204, 206, 208, 210, 212, 214, 216, 218, 220, 222, 224. In this particular implementation, storage system 12 is shown to also include server system 226 that includes four processors, namely processors 228, 230, 232, 234 (which are shown in phantom due to being positioned within system server 226 and not being externally visible). This implementation of storage system 12 is shown to also include battery backup system 236 that includes two battery packs, namely battery packs 238, 240 (which are shown in phantom due to being positioned within battery backup system 236 and not being externally visible).

Augmented Reality Process:

Assume for the following example that user 38 is an IT service technician that maintains storage system 12 and user 38 (via data-enabled, cellular telephone 30) wishes to use augmented reality process 10 to determine the "health" of storage system 12. Further assume for this illustrative example that storage system 12 includes an identification device (e.g., identification device 242) that may be used by augmented reality process 10 to positively identify storage system 12. Examples of identification device 242 may include but are not limited to an optical symbol (e.g., such as a QR code or a barcode) affixed to at least one IT component (included in storage system 12) and a wireless identifier tag (e.g., an RFID tag) affixed to at least one IT component (included in storage system 12). In this example, identifier 242 is shown affixed to battery backup system 236 included in storage system 12.

Figure 5:
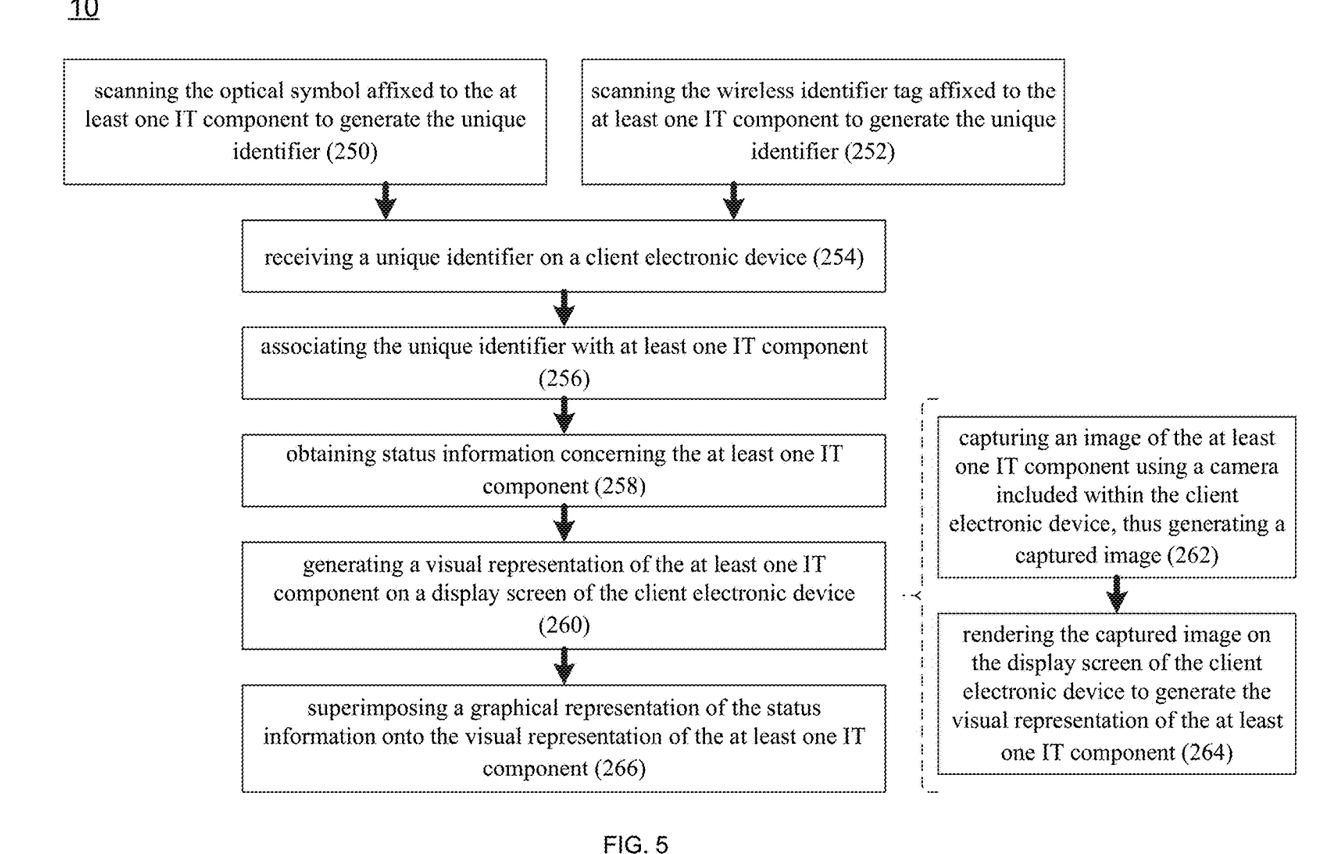
FIG. 5 is a flow chart of the augmented reality process of FIG. 1.

Referring also to FIG. 5, if identification device 242 is an optical symbol (e.g., such as a QR code or a barcode), augmented reality process 10 may scan 250 identification device 242 (i.e., the optical symbol affixed to battery backup system 236) to generate unique identifier 58 (FIG. 1). In this example, unique identifier 58 may be a unique optical identifier (e.g., a unique QR code or a unique bar code) that is obtained via a camera (not shown) included within e.g., data-enabled, cellular telephone 30.

If identification device 242 is a wireless identifier tag (e.g., such as an RFID tag), augmented reality process 10 may scan 252 identification device 242 (i.e., the wireless identifier tag affixed to battery backup system 236) to generate unique identifier 58 (FIG. 1). In this example, unique identifier 58 may be a unique wireless identifier (e.g., a signal emitted by/obtained from the RFID tag) that is obtained via a wireless receiver (mot shown) included within e.g., data-enabled, cellular telephone 30.

Augmented reality process 10 may receive 254 unique identifier 58 on the client electronic device (e.g., data-enabled, cellular telephone 30) and may associate 256 unique identifier 58 with at least one IT component. For example, upon user 38 scanning 250, 252 identification device 242 and receiving 254 unique identifier 48 on data-enabled, cellular telephone 30, augmented reality process 10 may compare unique identifier 58 to a database (e.g., database 60) of known unique identifiers, wherein each of these known unique identifiers may define a unique storage system. Continuing with the above-stated example, assume that unique identifier 58 is matched to one of the unique identifiers included within data 60, thus associating 256 unique identifier 58 with one or more IT components included within storage system 12.

Accordingly and in this example, unique identifier 58 is associated 256 with a storage system (e.g., storage system 12) that includes disk array system 200 (having storage targets 202, 204, 206, 208, 210, 212, 214, 216, 218, 220, 222, 224), server system 226 (having processors 228, 230, 232, 234), and battery backup system 236 (having battery packs 238, 240).

Augmented reality process 10 may obtain 258 status information 70 concerning the one or more IT components included within storage system 12. Since storage system 12 includes disk array system 200, server system 226, and battery backup system 236, the status information (e.g., status information 70) obtained 258 by augmented reality process 10 may include status information concerning these three IT components (namely disk array system 200, server system 226, and battery backup system 236).

Specifically, augmented reality process 10 may obtain 258 status information 70 for disk array system 200, server system 226, and battery backup system 236, wherein the status information (e.g., status information 70) obtained 258 by augmented reality process 10 may include status information concerning storage targets 202, 204, 206, 208, 210, 212, 214, 216, 218, 220, 222, 224 (included within disk array system 200), processors 228, 230, 232, 234 (included within server system 226), and battery packs 238, 240 (included within battery backup system 236).

For this example, assume that status information 70 obtained 258 by augmented reality process 10 identifies storage targets 202, 204, 208, 212, 216, 220, 222, 224 as operating properly, storage targets 206, 214 as failing (e.g., due to concerning SMART data) and storage targets 210, 218 as having failed. The status information concerning these storage targets may be obtained by augmented reality process 10 polling disk array system 200.

Further, assume that status information 70 obtained 258 by augmented reality process 10 identifies processors 230, 234 as managing a normal workload and processors 228, 232 as being overloaded. The status information concerning these processors may be obtained by augmented reality process 10 polling server system 226.

Additionally, assume that status information 70 obtained 258 by augmented reality process 10 identifies battery pack 238 as operating normally and battery pack 240 as failing (e.g., incapable of holding a full charge). The status information concerning these battery packs may be obtained by augmented reality process 10 polling battery backup system 236.

Figure 6:
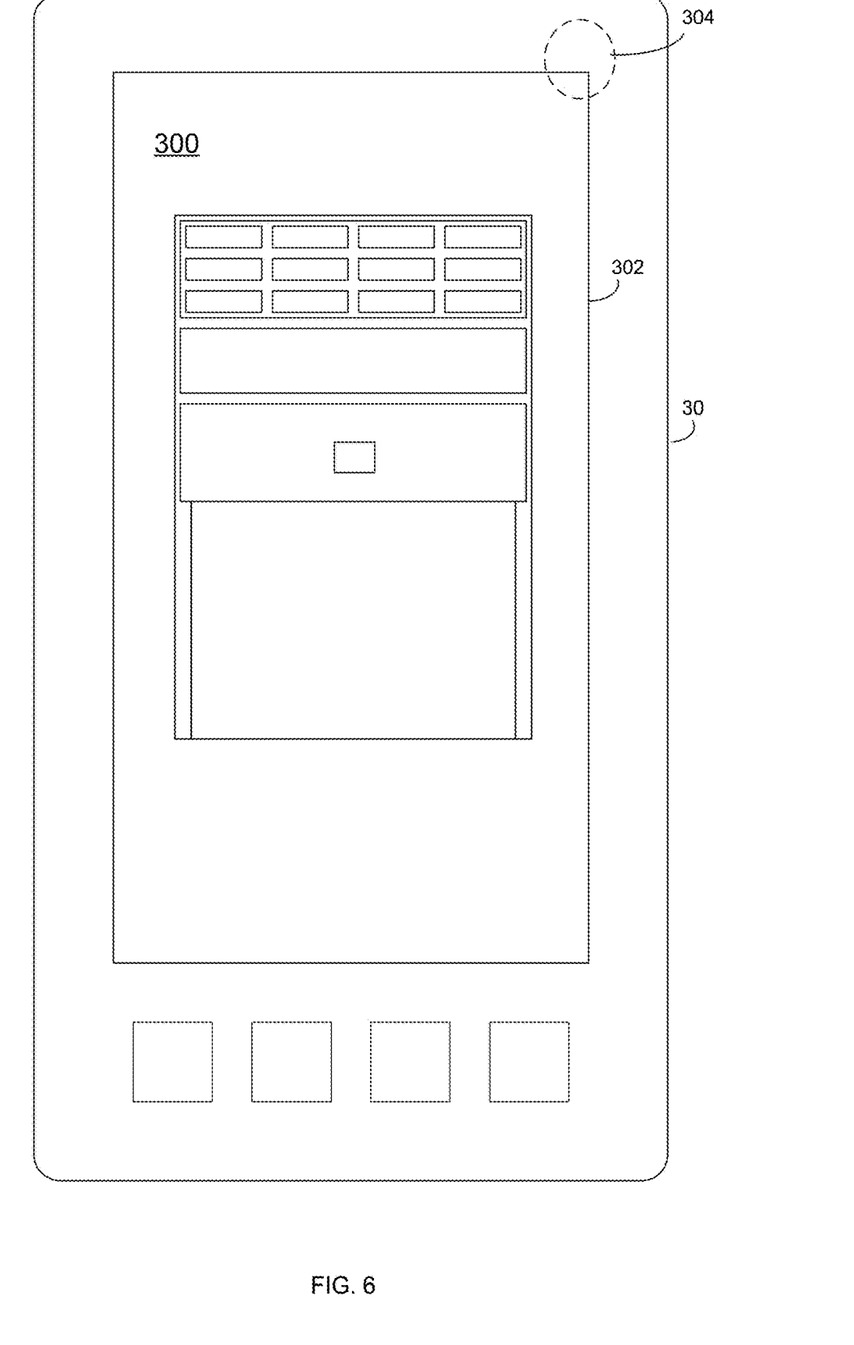
FIG. 6 is a diagrammatic view of an image of the storage system of FIG. 1.

Referring also to FIG. 6, augmented reality process 10 may generate 260 a visual representation (e.g., visual representation 300) of the one or more IT components (e.g., disk array system 200, server system 226, and battery backup system 236) on a display screen (e.g., display screen 302) of the client electronic device (e.g., data-enabled, cellular telephone 30).

When generating 260 visual representation 300 of the IT components (e.g., disk array system 200, server system 226, and battery backup system 236), augmented reality process 10 may capture 262 an image of the IT components (e.g., disk array system 200, server system 226, and battery backup system 236) using a camera (e.g., camera 304) included within the client electronic device (e.g., data-enabled, cellular telephone 30), thus generating a captured image. Augmented reality process 10 may then render 264 this captured image on display screen 302 of the client electronic device (e.g., data-enabled, cellular telephone 30), thus generating 260 visual representation 300 (e.g., a real time view) of the IT components (e.g., disk array system 200, server system 226, and battery backup system 236) of storage system 12.

Figure 7:
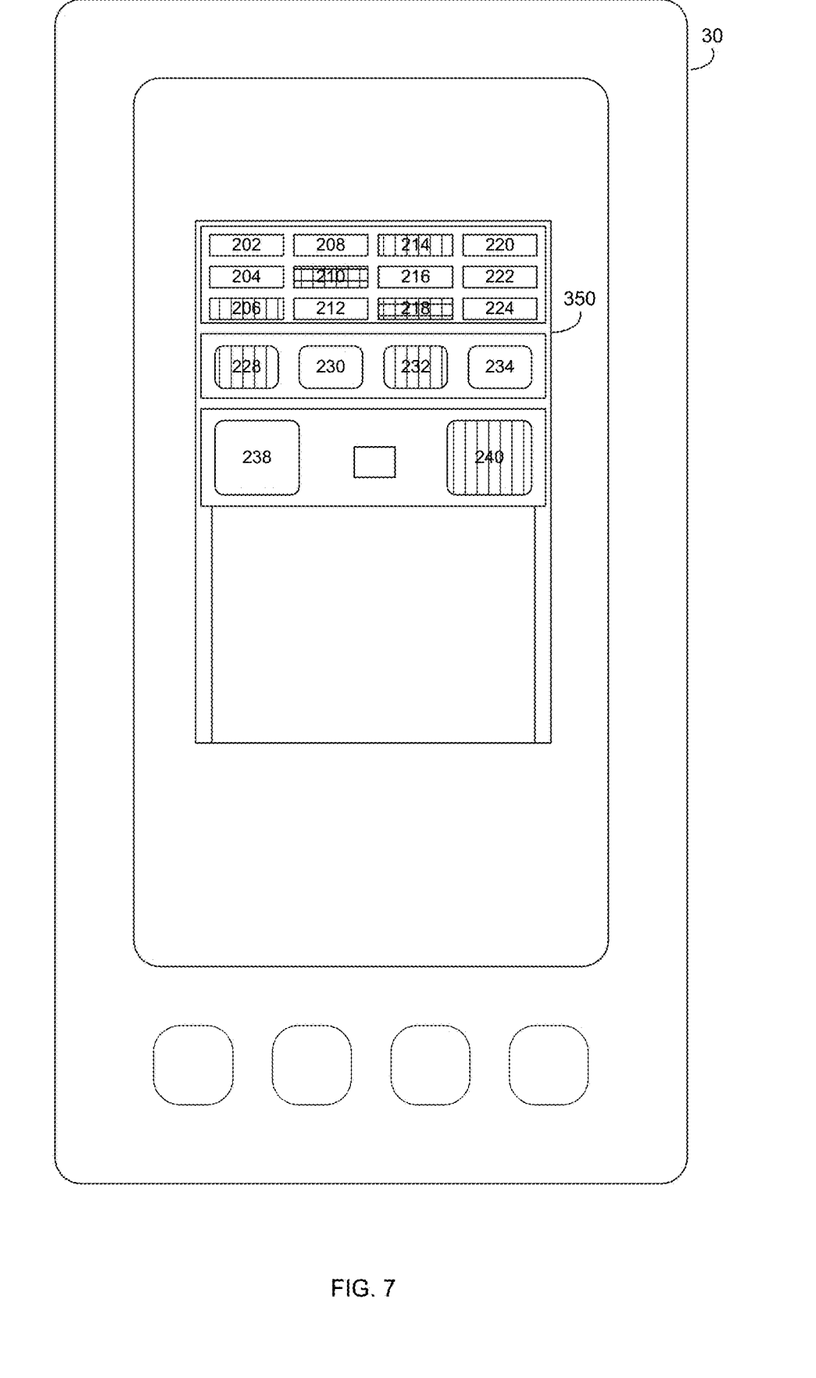
FIG. 7 is a diagrammatic view of another image of the storage system of FIG. 1.

Referring also to FIG. 7, augmented reality process 10 may then superimpose 266 a graphical representation (e.g., graphical representation 350) of status information 70 onto visual representation 300 of the IT components (e.g., disk array system 200, server system 226, and battery backup system 236) included within storage system 12. Graphical representation 350 may be semi-transparent in nature so that visual representation 300 may still be visible through graphical representation 350.

Since and as discussed above, storage targets 202, 204, 208, 212, 216, 220, 222, 224 are operating properly, these storage targets may be shaded green within graphical representation 350. And since storage targets 206, 214 are failing, these storage targets may be shaded yellow within graphical representation 350. And since storage targets 210, 218 have failed, these storage targets may be shaded red within graphical representation 350.

Further and as discussed above, since processors 230, 234 are managing a normal workload, these processors may be shaded green within graphical representation 350. And since processors 228, 232 as being overloaded, these processors may be shaded yellow within graphical representation 350.

Additionally and as discussed above, since battery pack 238 is operating normally, this battery pack may be shaded green within graphical representation 350. And since battery pack 240 is failing, this battery pack may be shaded yellow within graphical representation 350.

Other specific monitored and defined within graphical representation 350 may include but are not limited to: temperature, length of time in service, fan speed, error codes, network congestion, dropped packets, array component utilization, and SLO (Service Level Objective) compliance status.

As is known in the art, SLO compliance is indicative of how well the workload of a storage group/system is complying with the overall Service Level Objective (SLO). Possible values may include but are not limited to:

Stable (Green): Indicating that the storage group/system is performing within SLO targets;

Marginal (Yellow): Indicating that the storage group/system is performing below SLO targets; and Critical (Red): Indicating that the storage group/system is performing well below SLO targets.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data management processing apparatus, such that the instructions, which execute via the processor of the computer or other programmable data management processing apparatus, create means for implementing the functions/acts specified in the flowchart and/or block diagram block or blocks.

These computer program instructions may also be stored in a computer-readable memory that may direct a computer or other programmable data management processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data management processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    receiving a unique identifier on a client electronic device;
    associating the unique identifier with at least one IT component;
    obtaining status information concerning the at least one IT component;
    generating a visual representation of the at least one IT component on a display screen of the client electronic device, wherein generating a visual representation of the at least one IT component includes:
        capturing an image of the at least one IT component using a camera included within the client electronic device, thus generating a captured image, and
        rendering the captured image on the display screen of the client electronic device to generate the visual representation of the at least one IT component; and
    superimposing a graphical representation of the status information onto the visual representation of the at least one IT component.

2. The computer-implemented method of claim 1 wherein the at least one IT component includes one or more of:
    a server system;
    a disk array system;
    a storage processor system;
    a storage processor/disk system; and
    a battery backup system.

3. The computer-implemented method of claim 1 wherein the unique identifier is encoded within one or more of:
    an optical symbol affixed to the at least one IT component; and
    a wireless identifier tag affixed to the at least one IT component.

4. The computer-implemented method of claim 3 further comprising:
    scanning the optical symbol affixed to the at least one IT component to generate the unique identifier.

5. The computer-implemented method of claim 3 further comprising:
    scanning the wireless identifier tag affixed to the at least one IT component to generate the unique identifier.

6. A computer program product residing on a computer readable medium having a plurality of instructions stored thereon which, when executed by a processor, cause the processor to perform operations comprising:
    receiving a unique identifier on a client electronic device;
    associating the unique identifier with at least one IT component;
    obtaining status information concerning the at least one IT component;
    generating a visual representation of the at least one IT component on a display screen of the client electronic device, wherein generating a visual representation of the at least one IT component includes:
        capturing an image of the at least one IT component using a camera included within the client electronic device, thus generating a captured image, and
        rendering the captured image on the display screen of the client electronic device to generate the visual representation of the at least one IT component; and
    superimposing a graphical representation of the status information onto the visual representation of the at least one IT component.

7. The computer program product of claim 6 wherein the at least one IT component includes one or more of:
    a server system;
    a disk array system;
    a storage processor system;
    a storage processor/disk system; and
    a battery backup system.

8. The computer program product of claim 6 wherein the unique identifier is encoded within one or more of:
    an optical symbol affixed to the at least one IT component; and
    a wireless identifier tag affixed to the at least one IT component.

9. The computer program product of claim 8 further comprising instructions for:
    scanning the optical symbol affixed to the at least one IT component to generate the unique identifier.

10. The computer program product of claim 8 further comprising instructions for:
    scanning the wireless identifier tag affixed to the at least one IT component to generate the unique identifier.

11. A computing system including a processor and memory configured to perform operations comprising:
    receiving a unique identifier on a client electronic device;
    associating the unique identifier with at least one IT component;
    obtaining status information concerning the at least one IT component;
    generating a visual representation of the at least one IT component on a display screen of the client electronic device, wherein generating a visual representation of the at least one IT component includes:
        capturing an image of the at least one IT component using a camera included within the client electronic device, thus generating a captured image, and
        rendering the captured image on the display screen of the client electronic device to generate the visual representation of the at least one IT component; and
    superimposing a graphical representation of the status information onto the visual representation of the at least one IT component.

12. The computing system of claim 11 wherein the at least one IT component includes one or more of:
- a server system;
- a disk array system;
- a storage processor system;
- a storage processor/disk system; and
- a battery backup system.

13. The computing system of claim 11 wherein the unique identifier is encoded within one or more of:
- an optical symbol affixed to the at least one IT component; and
- a wireless identifier tag affixed to the at least one IT component.

14. The computing system of claim 13 further configured to perform operations comprising:
- scanning the optical symbol affixed to the at least one IT component to generate the unique identifier.

15. The computing system of claim 13 further configured to perform operations comprising:
- scanning the wireless identifier tag affixed to the at least one IT component to generate the unique identifier.

* * * * *